Jan. 25, 1966   C. E. COLLING   3,230,659
FISHERMAN'S BALL
Filed Oct. 18, 1961
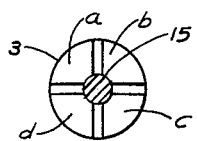
FIG._5
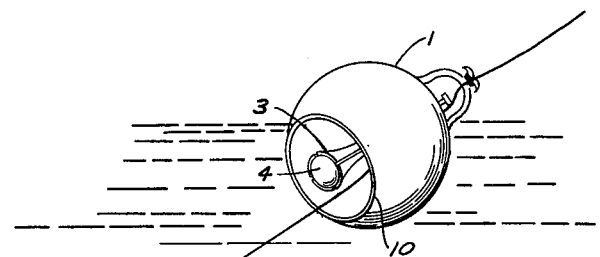
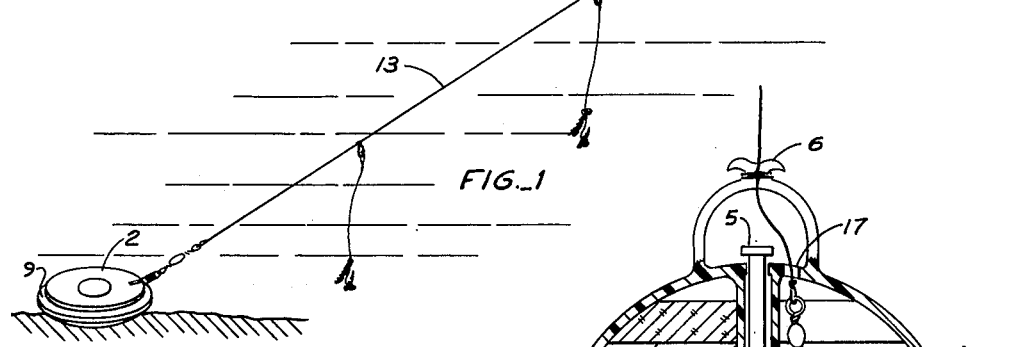
FIG._1
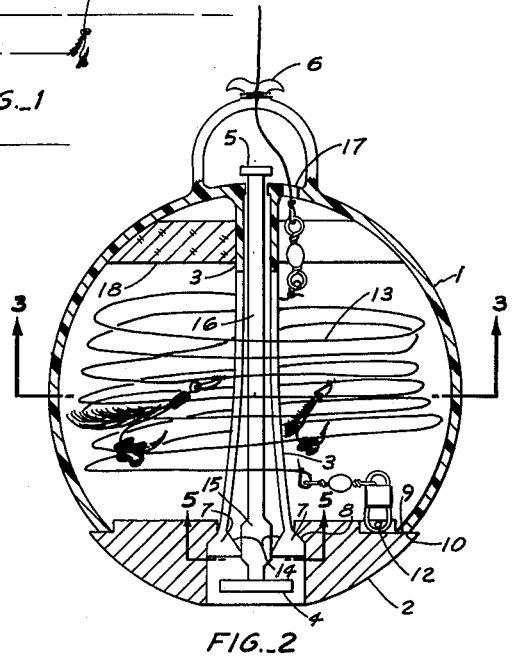
FIG._2
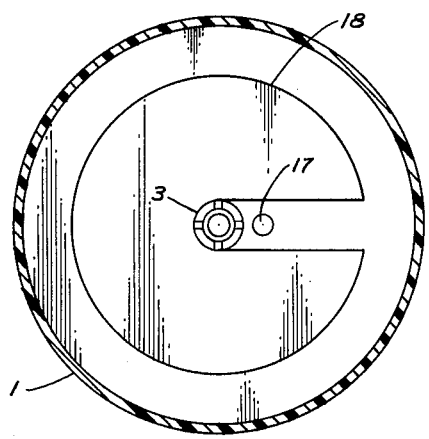
FIG._3
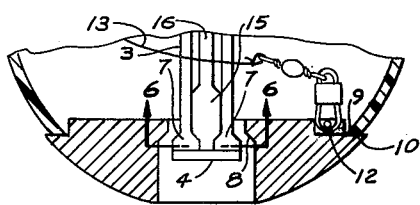
FIG._4
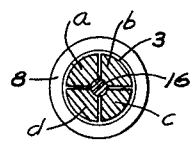
FIG._6
INVENTOR.
CHARLES E. COLLING
BY
Allen and Chromy

United States Patent Office 3,230,659
Patented Jan. 25, 1966

3,230,659
FISHERMAN'S BALL
Charles E. Colling, 4861 Los Gatos Road, Scotts Valley, Santa Cruz, Calif.
Filed Oct. 18, 1961, Ser. No. 145,863
4 Claims. (Cl. 43—43.11)

This invention relates generally to a fisherman's device which is in the form of a container attached to the fishing line for bait, hooks, etc.

An object of this invention is to provide a container attached to the fishing line for housing the fishhook and bait from which the fishhook and bait are discharged when the container strikes the water.

Another object of this invention is to provide a container to enclose the bait, lure and hook, said container having a lock for holding the container cover thereon, which cover is also adapted to function as a sinker.

Still another object of this invention is to provide an improved fisherman's device in which the bait, lure and hook are enclosed in a container from which the bait, lure and hok are drawn by the sinker when the container strikes the water, the impact of the device with the water releasing said sinker from the container.

A further object of this invention is to provide an improved fishing device in which the bait, lure and hook are enclosed in a container which may be thrown with considerable force as by use of a fishing pole and still not dislodge the bait from the hook when the container strikes the water and the bait, lure and hook are discharged therefrom.

A further object of this invention is to provide an improved fishing device in which the bait, lure and hook are enclosed in a container that may be thrown a great distance by a sling shot, portable launcher or other device and from which the bait, lure and hook are discharged when the container hits the water without dislodging the bait from the hook.

A further object of this invention is to provide an improved fishing tackle in which the bait, lure and hook are enclosed in a container assembled ready for use which may be carried on the person or in a fishing box when traveling to and from the fishing grounds without danger of the hook being tangled in the person's clothes or doing other damage.

The foregoing and other objects and advantages, which will become apparent to those skilled in the art to which this invention relates, reside in the details of construction and operation as more fully set forth in the following specification, claims and drawing which forms a part hereof and in which briefly:

FIG. 1 is a view of this fishing device showing the sinker cover removed from the container of the device and the bait, lure and hooks discharged from the container which is shown floating on the surface of the water;

FIG. 2 is a sectional view taken through the container of this fishing device showing the sinker-cover locked on the container and showing the hooks and bait inside of the container;

FIG. 3 is a sectional view taken along the line 3—3 of FIG. 2;

FIG. 4 is a fragmentary sectional view showing the expandable locking means contracted so that the sinker-cover may be removed from the container;

FIG. 5 is a detail sectional view taken along the line 5—5 of FIG .2; and

FIG. 6 is a sectional view taken along the line 6—6 of FIG. 4.

Referring to the drawing in detail, reference numeral 1 designates a ball or container for housing the bait, lure and fishhook or fishhooks.

The ball 1 is made of transparent or colored plastic or light metal of round, tubular or elliptical shape. It may be of any convenient size so that the bait, lure and hook, or multiples of each thereof that are to be used, may be enclosed therein.

The ball or container 1 is provided with a cover 2 that also functions as the sinker or weight of this fishing device. The sinker or weight 2 may be made of plastic, lead or other metal, such as, aluminum, or alloy, such as, brass and by varying the shape thereof it may be made of the desired weight that is needed for the particular type of fishing desired. The central part of the sinker 2 is provided with a hole in which there is formed a ledge or catch portion 8 that is near the inner lip portion of the hole. The outer or circumferential part of the sinker 2 is provided with a groove 9 for receiving the lip 10 of the container 1 when the sinker 2 is assembled on the container so that the sinker 2 functions as a closure for the container.

The tubular member 3 which is made a part of or secured as a part of the container 1 extends through the central part of the container. The major part of this member 3 is cut or divided lengthwise into four parts. The free ends of this member is provided with catch members or lobes 7 which are adapted to engage the ledge or catch 8 of the sinker 2 when the free end of the member 3 is expanded by means of the movable lobe 15. The lobe 15 is connected to a small shaft 16 which extends through the central part of the member 3 and out of the container 1 through a suitable hole. The outside end of the shaft 16 is provided with a lockset 5 and the other end of this shaft which extends into the hole in the center of sinker 2 is provided with a trip member 4.

The fishing line leader 13 is attached to the sinker 2 by means of the pin 12 which is imbedded in the sinker in a suitable recess formed therein. The leader also passes out of the container 1 through the hole 17 and is attached to the fishing line which is wound around the fishing line tie 6 that is attached to the outside of the container.

This fisherman's ball or device is simple to use. First it is opened by pulling on the lockset member 5 so that the lobe 15 is drawn into the member 3 as far as it will go into the position shown in FIG. 4 in which the four parts a, b, c, d of the member 3 are clustered together as shown in FIG. 6 and the catch members 7 are disengaged from the ledge 8 of the sinker 2. Thus the sinker 2 is released and allowed to separate from the ball 1. The fishing line leader is then attached to the pin 12 of the sinker 2 and the fishing line is threaded into the container 1 through the hole 17 and tied to the other end of the leader 13. The fishing line is then pulled out of the container 1 until the swivel of the leader tied to the fishing line is adjacent to the hole 17. The fishing line is then secured to the member 6. The bait and lure, if desired, are then attached to the hooks of the leader and the bait, lure and hooks are then inserted into the container 1 through the hole in the bottom thereof and the sinker 2 is placed over said hole. The sinker 2 is secured in position on the ball 1 by pushing down on the lockset 5 which forces the lobe 15 to engage the inner lobes 14 of the member 3 to expand or spread apart the parts a, b, c and d of this member as shown in FIG. 5. This causes the lower surfaces of the catch 7 to engage the ledge 8 of the sinker 2 as shown in FIG. 2 whereby the sinker 2 is secured on the container 1 and functions as a cover for the opening in the bottom thereof.

When this device is cast and strikes the water, the impact of the water on the trip 4 forces this trip inwardly of the container so that the inner surface thereof engages the end of member 3 as shown in FIG. 4. Thus the sinker 2 is released from the container 1 since the lobes 7 are disengaged from the ledge 8. When the sinker 2 is released from the container, it pulls the lure, bait and hooks out of the container as shown in FIG. 1. The sinker drops into the water while the ball 1 remains floating. A float 18 may be provided inside of the ball 1 if it is desired to provide additional buoyancy to the ball.

While I have described and illustrated a preferred embodiment of this invention, it is desired that this invention is not limited to the details thereof except insofar as those details are set forth in the appended claims.

Having thus completely and fully described the invention, what is now claimed as new is as follows:

1. A fisherman's article of the class described comprising in combination a hollow ball-shaped container having an opening through which a bait and fish hook may be placed therein, a sinker shaped to cover said opening, a fishing line having means for attaching it to said sinker and said hook, a latch mechanism attached to said container for holding said sinker over said opening to prevent undesired release of said bait and fish hook from said container, said latch mechanism having means for releasing said latch mechanism when said container and sinker hit the water so that said sinker pulls said bait and hook out of said container into the water.

2. A fisherman's article of the class described comprising in combination a hollow ball-shaped container having a small hole for receiving a fishing line, said container having an opening through which a bait and fish hook may be placed therein, a sinker shaped to cover said opening, a leader line connecting said sinker and said hook to the fishing line, said sinker having a hole therein, a latch mechanism attached to said container and extending into the hole of said sinker for holding said sinker over said opening to prevent undesired release of said bait and fish hook from said container, said latch mechanism having means for releasing said latch mechanism when said container and sinker hit the water so that said sinker pulls said bait and hook out of said container into the water.

3. A fisherman's article of the class described comprising in combination a hollow ball-shaped container having a small hole for receiving a fishing line, said container having an opening through which a bait and fish hook may be placed therein, a sinker shaped to cover said opening, a leader line connecting said sinker and said hook to the fishing line, said sinker having a hole therein, an expandable latch mechanism attached to said container and extending into the hole of said sinker, means for expanding said mechanism in said sinker for holding said sinker over said opening to prevent undesired release of said bait and fish hook from said container, said expanding means permitting said latch mechanism to contract and release said latch mechanism when said container and sinker hit the water so that said sinker pulls said bait and hook out of said container into the water.

4. A fisherman's article of the class described comprising in combination a hollow ball-shaped container having a small hole for receiving a fishing line, said container having an opening through which a bait and fish hook may be placed therein, a sinker shaped to cover said opening, a leader line connecting said sinker and said hook to the fishing line, said sinker having a hole therein, a deformable latch mechanism attached to said container and extending into the hole of said sinker, means for deforming said mechanism for holding said sinker over said opening to prevent undesired release of said bait and fish hook from said container, said deforming means releasing said latch mechanism when said container and sinker hit the water so that said sinker pulls said bait and hook out of said container into the water.

References Cited by the Examiner
UNITED STATES PATENTS

| 2,475,736 | 7/1949 | Burrous | 43—41.2 |
| 2,694,878 | 11/1954 | Martens | 43—43.11 |
| 2,904,923 | 9/1959 | Conyers | 43—43.11 |

SAMUEL KOREN, *Primary Examiner.*

ABRAHAM G. STONE, JOSEPH S. REICH,
*Examiners.*